United States Patent [19]

Gitlin et al.

[11] 4,021,738
[45] May 3, 1977

[54] ADAPTIVE EQUALIZER WITH FAST CONVERGENCE PROPERTIES

[75] Inventors: Richard Dennis Gitlin; Francis Robert Magee, Jr., both of Monmouth Beach, N.J.

[73] Assignee: Bell Telephone Laboratories, Incorporated, Murray Hill, N.J.

[22] Filed: Mar. 1, 1976

[21] Appl. No.: 662,528

[52] U.S. Cl. .................................. 325/323; 325/42; 325/324; 333/18
[51] Int. Cl.² ........................................... H04B 1/10
[58] Field of Search ................... 325/42, 323, 324; 333/18; 178/69

[56] References Cited

UNITED STATES PATENTS

| | | | |
|---|---|---|---|
| 3,697,897 | 10/1972 | Chang | 333/18 |
| 3,715,665 | 2/1973 | Chang | 325/42 |
| 3,931,604 | 1/1976 | Treynor | 333/18 |

*Primary Examiner*—Benedict V. Safourek
*Assistant Examiner*—Michael A. Masinick
*Attorney, Agent, or Firm*—Joseph P. Kearns

[57] ABSTRACT

An automatic and adaptive time-domain equalizer with a first transversal structure operating on received signal samples has its convergence properties improved by the addition of a second transversal structure operating on detected signal samples and having its tap-gain settings conjugate, i.e., reversed in time, with respect to those of the first transversal structure for effectively measuring the spread of tap gain values generated at the first transversal structure and a third transversal structure also operating on received signal samples but having its tap-gain settings determined by the spreading error. The matrix product of the spreading-error tap-gain values and received signal samples modifies the up-dating of the tap-gain values controlling the first transversal structure. The resultant faster convergence is particularly useful in the presence of severe amplitude distortion in the data transmission channel.

6 Claims, 2 Drawing Figures

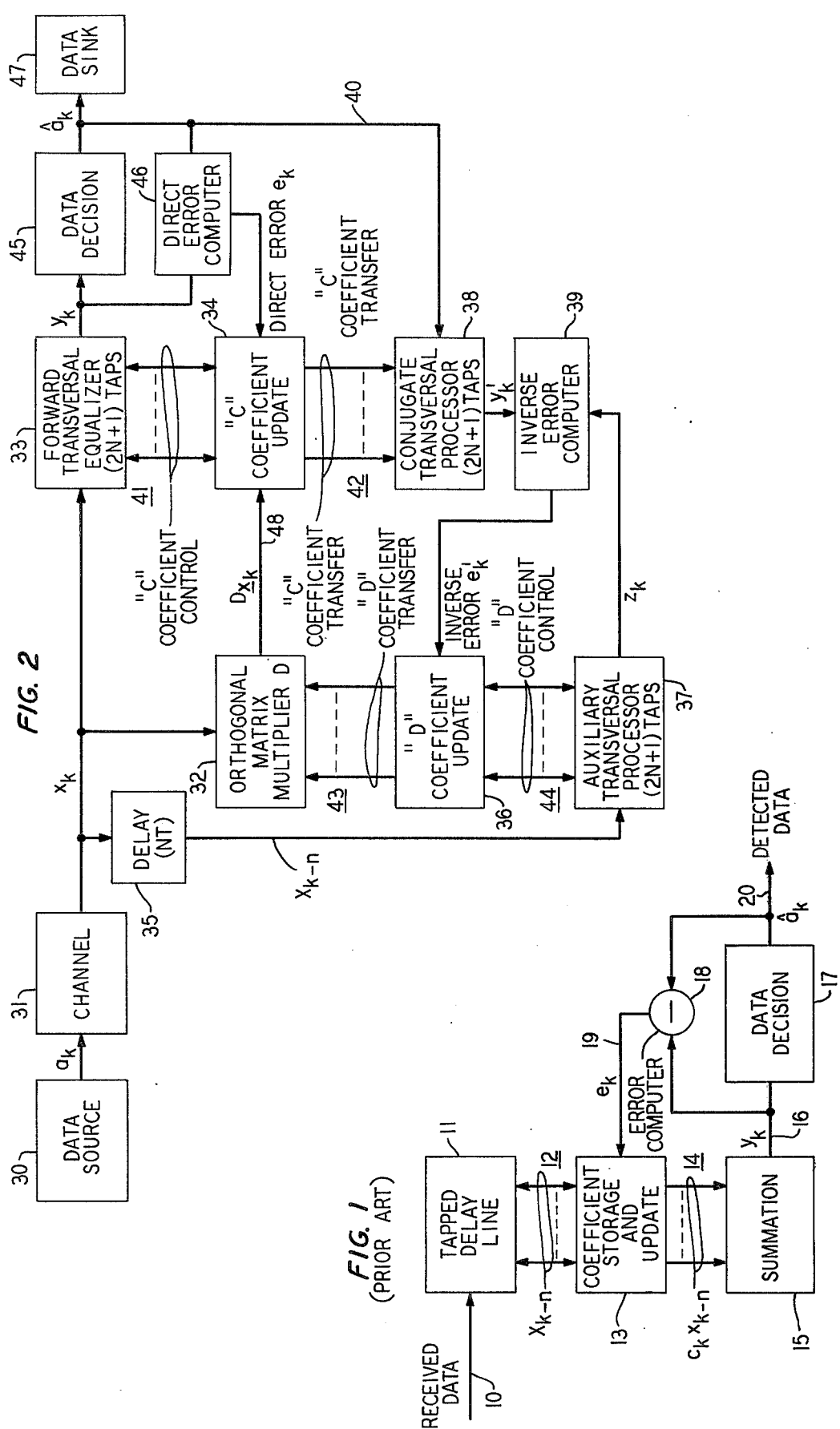

ADAPTIVE EQUALIZER WITH FAST CONVERGENCE PROPERTIES

FIELD OF THE INVENTION

This invention relates to the correction of the distorting effects of limited frequency bandwidth on digital data signals and in particular to the accelerated convergence of tap-gain settings in time-domain equalizers of the transversal type toward optimum values.

BACKGROUND OF THE INVENTION

The transmission of digital data at high speeds, e.g., 9600 bits per second and higher, over band-limited transmission channels, such as telephone voice channels, requires precision control over impairments resulting from linear distortion. The instrumentality widely applied to compensate for linear impairments like amplitude and delay distortion, which give rise to intersymbol interference, is the transversal equalizer which generates a linear combination of selectively weighted consecutive samples of received data signals. The selective weights exist as a plurality of tap-gain values applied to delayed replicas of synchronous samples of received data signals spread over a tapped delay line or shift register. Typically, the tap-gain values are determined according to a performance criterion which minimizes the mean-square error difference between the actual equalizer output and discrete permissible outputs. Such error difference is then correlated with each of the tap outputs to adjust individual tap-gain values in accordance with the gradient of the error with respect to the existing tap-gain value.

The process of obtaining optimum tap-gain values adaptive to training sequences or to raw data is iterative. The time required for initial convergence to optimum values is called settling time, and for severely distorted transmission channels, can be projected beyond practical limits for many data applications. In polling situations, for example, messages are frequent but short, with the possible result that settling time can exceed message time.

Prior proposals for the reduction of settling time have involved the orthogonalization of the transmission channel correlation matrix, a matrix formed from all the possible cross-products of the signal samples incident on the delay-line structure during each signaling interval. Orthogonalization accelerates convergence, and has been achieved in a relatively straightforward manner when the channel characteristics are known in advance. Attempts to perform an orthogonalization adaptively have resulted in complex equalizer structures which create minimal reduction in overall settling time when orthogonalization time itself is included.

It is an object of this invention to provide rapid adaptive self-orthogonalization of data signal samples stored in a tapped delay line in order to reduce settling time in transversal equalizers.

It is another object of this invention to accelerate the initial convergence of tap gain coefficients in transversal equalizers for digital data transmission systems to optimum values.

It is a further object of this invention to implement a self-orthogonalizing gradient adjustment algorithm for linear tapped delay line transversal equalizers in digital data transmission systems to reduce settling time for equalizer tap weights which minimize mean-square error.

SUMMARY OF THE INVENTION

The above and other objects of this invention are accomplished according to this invention by the combination with a principal forward equalizer of the transversal type operating on the direct received signal of a conjugate transversal structure to which the forward tap-gain coefficients are applied in reverse time sequence, an auxiliary forward equalizer operating on a delayed received signal to generate an orthogonalizing set of tap-gain coefficients, and a matrix multiplier for orthogonalizing received signal samples used in updating the tap-gain coefficients of the principal forward equalizer. The tap-gain coefficients in the principal equalizer are updated from a first error signal derived from the mean-square difference between the actual equalizer output and a quantized transformation thereof in conjunction with the orthogonalized received-signal samples. The tap-gain coefficients in the auxiliary forward equalizer are updated from a second error signal derived from the difference between the actual outputs of the auxiliary equalizer and the conjugate transversal structure. The second error signal is a measure of the eccentricity of the first error signal with respect to the array of received signal samples stored in the principal equalizer. The array of tap-gain values adaptively resulting in the auxiliary equalizer becomes a self-orthogonalizing premultiplier for received signals before application to the coefficient updating circuits of the principal equalizer. Thus, the tap-gain coefficients effective at the principal equalizer are preconditioned for rapid convergence and reduced settling time.

The implementation of this invention according to to the foregoing principles has the advantages of being applicable to either the preset automatic or data-directed adaptive equalization mode; to either baseband or passband i.e., post-demodulation, or predemodulation equalization; and to either feedforward (non-recursive) or feedback (recursive) equalization.

DETAILED DESCRIPTION

The above and other objects and advantages of this invention will be more fully appreciated from a consideration of the following detailed description and the drawing in which FIG. 1 is a block diagram of a transversal equalizer of the prior art which is not provided with the fast-convergence improvement according to this invention; and FIG. 2 is a block diagram of an adaptive self-orthogonalized transversal equalizer for a digital data transmission system in accordance with this invention.

DETAILED DESCRIPTION OF A PREFERRED EMBODIMENT

For purposes of illustration it is assumed that a baseband pulse-amplitude-modulated (PAM) digital data transmission system is being employed on a telephone voiceband channel. The basic signaling rate is the reciprocal ($1/T$) of the baud (symbols per second) interval T and is numerically equal to 2400 baud ($T = 416^{+}$ microsecond). The binary transmission rate is equal to the baud rate. For n-level (multilevel) coding, however, the equivalent binary or bit rate would be $\log_2 n$ times the baud rate i.e., for four-level encoding the equivalent binary rate would be 9600 in a 2400-baud system. The selection of a baseband system for illustration does not preclude the application of the principles of this invention to modulated passband data systems.

FIG. 1 is a block diagram representing the portion of a baseband data receiver employing an automatic or an adaptive tapped-delay-line (TDL) transversal equalizer. The equalizer comprises tapped delay line 11 having a plurality of time-spaced outputs on leads 12, coefficient storage and update unit 13, summation circuit 15, data decision circuit 17 and error computer 18. Error feedback from data decision 17 and error computer 18 to coefficient storage unit 13 is provided over lead 19. Data signals received or incoming line 10 represent a discrete valued independent data sequence $\{a_m\}$ and are sampled at the baud rate 1/T. The impulse response of the transmission channel is represented by the pulse $h(t)$ and is corrupted by additive noise $w(t)$. The synchronously sampled signal $x(nT)$ is applied to tapped delay line 11 in order to derive an equalized output $y(nT)$ on lead 16 from summation circuit 15 after selective coefficient operations in coefficient storage 33. The objective is to make each equalizer output $y_k$ a good and usable approximation to each transmitted signal $a_k$. The equalizer output is estimated and quantized in data decision circuit 17 to a decision or estimate $\hat{a}_k$. The difference taken in error computer 18 between the individual analog input $y_k$ and decision output $\hat{a}_k$ on lead 20 is direct error signal $e_k$ on lead 19.

The sampled received data signal on lead 10 can be written as $$x_n = \sum_m a_m h_{n-m} + w_n, \tag{1}$$

where $n$ = index of transmitted symbols.
The equalizer output on lead 16 is $$y_n = \sum_{m=N}^{N} c_m x_{n-m}, \tag{2}$$

where $m$ = index of tap locations.

Tapped delay line 11 is assumed to be symmetrical for analytical purposes with a center tap, N leading taps and N lagging taps for a total of $m = 2N + 1$. The coefficients or tap weights stored and updated in storage unit 13 are represented by $\underline{c}$ in equation (2). The signal samples on tapped delay line 11 appear on leads 12 as $x_{k-n}$ ($k$ is a time index) and are applied to coefficient storage 13 for multiplication by tap coefficients $\underline{c}_k$ to form products $c_k x_{k-n}$ on output leads 14 for application to summation circuit 15, whose output is the overall equalizer output $y_k$ on lead 36 represented by equation (2).

Data decision circuit 17 stores the allowable discrete data levels $a_n$ and operate to compare the analog inputs $y_k$ with these discrete levels to make data decisions $\hat{a}_k$. A direct error output is formed in error computer 18 as the mean-square error difference $$U = E[(y_n - a_n)^2] = E[e_n^2], \tag{3}$$

where
$E[\ ]$ = expectation and
$e_n$ = error signal.

By carrying out the indicated squaring operation equation (3) can be transformed into vector form as a function of the tap-gain coefficients. Thus, $$U(\underline{c}) = \underline{c}^T A \underline{c} - 2\underline{c}^T \underline{h} + 1, \tag{4}$$

where
$\underline{c}$ = vector array of tap-gain coefficients,
$\underline{c}^T$ = transpose of vector $\underline{c}$,
$\underline{h}$ = vector array of received signal samples including channel impulse-response components, and
$A$ = transmission channel correlation matrix formed of the products of the signal samples on delay line 11.

Each element of the A matrix, which is a square matrix is defined as $$A_{ij} = \sum_{p=-\infty}^{\infty} h_{p-i+1} h_{p-j+1} \tag{5}$$

where $i, j$ = row and column indicies.

By differentiating equation (4) with respect to the tap vector $\underline{c}$ and setting the resultant equal to zero the optimum tap vector is seen to be $$\underline{c}_{optimum} = A^{-1} \underline{h} \tag{6}$$

(Underlined elements are conceptually vectors.)

Equation (6) states that the optimum tap-gain coefficients are functions of the inverse of the A correlation matrix and the $\underline{h}$ tap sample vector.

Equation (6) cannot be employed directly to obtain tap-gain settings because the transmission channel characteristics are unknown to the receiver. Furthermore, the calculation of the inverse matrix becomes quite complex for transversal filters having more than three taps. Instead a steepest descent or gradient algorithm is used to adjust tap-gain vectors. Thus, $$\underline{c}_{k+1} = \underline{c}_k - \alpha_k (A\underline{c}_k - \underline{h}) \tag{7}$$

where
$\underline{c}_k$ = present tap vector,
$\underline{c}_{k+1}$ = tap vector to be obtained,
$\alpha_k$ = step adjustment size, and
$A\underline{c}_k - \underline{h}$ = correction term in a steepest-descent technique.

For the unavailable correction term ($A\underline{c}_k - \underline{h}$) we will substitute the gradient of $e_n^2$, with respect to $\underline{c}_k$. Equation (7) can then be written in the form $$\underline{c}_{k+1} = \underline{c}_k - \alpha_k g_k, \tag{8}$$

where $g_k$ is the gradient of $e_n^2$ with respect to $\underline{c}_k$.

For severe initial channel distortion a known training sequence is commonly transmitted prior to data transmission. Then the gradient becomes $$g_k = (y_k - a_k) \underline{x}_k \tag{9}$$

where
$y_k$ = analog input to decision circuit 17 in FIG. 1,
$a_k$ = quantized output from decision circuit 17, and
$x_k$ = vector of tap samples on leads 12 at TDL output.
Equation (8) then becomes $$\underline{c}_{k+1} = \underline{c}_k - \alpha_k e_k \underline{x}_k, \tag{10}$$

where $e_k = y_k - a_k$.

Equation (10) states that succeeding tap vectors are derived from preceding vectors by iterative adjustment in a direction opposite to the instantaneous polarity of the error correlated with the tap sample.

The convergence characteristics of equation (10) depend on the distortion level of the transmission channel and can be quite prolonged.

Where the initial distortion is moderate, or the continuing distortion is time variant, the error gradient can be estimated adaptively from data decisions. Then the algorithm of equation (10) is modified to read $$\underline{c}_{k+1} = \underline{c}_k - \alpha_k(y_k - \hat{a}_k)\underline{x}_k \quad (11)$$

Equation (11) differs from equation (10) only in using an estimated quantization $\hat{a}_k$ rather than an assured value related to the known training sequence. The estimated quantization is often simplified to the algebraic sign of the analog output $y_k$ (sgn $y_k$).

Equations (10) and (11) are seen to be variations of equation (7) in which the A matrix appears. As a practical matter prior to the present invention the inverse correlation matrix can only be implemented when the channel impulse response characteristics are known in advance. Equation (7), however, can be modified for analytical purposes to include a new matrix D. Thus, $$\underline{c}_{k+1} = \underline{c}_k - \alpha_k D_k(A\underline{c}_k - \underline{h}) \quad (12)$$

If $D_k$ in equation (12) equals the inverse, $A^{-1}$, of the correlation matrix A, and the step-size $\alpha_K$ equals unity, then the second term on the right side of equation (12) becomes $$\alpha_k D_k(A\underline{c}_k - \underline{h}) = A^{-1}A\underline{c}_k - A^{-1}\underline{h} \quad (13)$$

One-step convergence becomes possible when the step size $\alpha_k$ is unity and equation (12) reduces to $$\underline{c}_{k+1} = \underline{c}_{opt} \quad (14)$$

On the assumption of a large number of TDL taps one can write the Fourier transform in the frequency domain of the optimizing equation (6) as $$C_{opt}^*(\omega) = H(\omega)A^{-1}(\omega). \quad (15)$$

(The asterisk indicates conjugacy.)

Both sides of equation (15) can be multiplied by the frequency spectrum $S(\omega)$ of the transmitted signal to obtain $$S(\omega)H(\omega)A^{-1}(\omega) = S(\omega)C(\omega). \quad (16)$$

The product $S(\omega)H(\omega)$ is the transform of the noiseless received signal $x(n)$ and the product $S(\omega)C^*(\omega)$ represents the data bits convolved with the TDL structure whose taps are time reversed. $A^{-1}(\omega)$ is an orthogonalizing matrix which will transform the correlation matrix into the identity matrix. A new error signal can be written as $$E'(\omega) = X(\omega)D(\omega) - S(\omega)C^*(\omega), \quad (17)$$

where $D(\omega)$ replaces $A^{-1}(\omega)$, and $X(\omega) = S(\omega)H(\omega)$.

The error $E'(w)$ is an additional measure of how close the equalizer tap gains are to their optimum values.

Equation (17) can be interpreted in the time-domain using vector notation as $$e'_k = \underline{x}_k^T \underline{d}_k - \hat{a}_k^T \underline{c}_k \quad (18)$$

where
  $\underline{d}$ = vector corresponding to the spectrum $D(\omega)$ representing a new array of tap-gain coefficents, and
  $\underline{c}_k' = \underline{c}$ coefficients reversed in time.

Vector $\underline{d}$ is analogous to vector $\underline{c}$ and is updated in a manner similar to that prescribed for vector $\underline{c}$ in equation (10). Thus, $$\underline{d}_{k+1} = \underline{d}_k - \beta_k e_k' \underline{x}_k, \quad (19)$$

and, $$\underline{c}_{k+1} = \underline{c}_k - \alpha_k e_k D_k \underline{x}_k \quad (20)$$

where $\beta_k$ = a step size, and
  $D_k$ is the Toeplitz matrix whose diagonal entries are the components of $\underline{d}_k$.

The vector $\underline{d}_k$, in addition to being applied to an auxiliary TDL to assist in generating the inverse error $e_k'$, is also used to generate the self-orthogonalizing multiplier $D_k$, which is applied to the received signal samples $\underline{x}_k$ before $\underline{c}$ coefficient updating.

The first product $\underline{x}_k^T \underline{d}_k$ on the right hand side of equation (18) can be implemented by multiplying consecutive samples of the received signal by individual gain coefficents in the $\underline{d}_k$ vector before application of these samples to the modification of the $\underline{c}_k$ tap-gain coefficients for the forward transversal equalizer. The $\underline{c}$ coefficients of the forward equalizer are thus orthogonalized on the average in accordance with equation (12), and in practice in accordance with equation (20).

FIG. 2 is a block diagram of a baseband PAM digital data transmission system including at the receiver terminal a transversal equalizer improved according to this invention to achieve fast initial convergence to optimuum tap-gain coefficients. The data transmission system comprises data source 30, transmission channel 31 and data sink 47. A substantially random sequence of digital data signals $a_k$ is synchronously emitted from data source 30 at a transmitter terminal and is applied to channel 31, which is presumed to include such modulation and demodulation facilities as are required to deliver data signals to a remote receiver terminal. The channel 31 output is a sequence of synchronous samples $x_k$ from which the original data sequence is to be recovered and delivered as estimated sequence $\hat{a}_k$ to data sink 47. In the absence of amplitude and delay distortion the transmission system would be complete with these elements. However, as previously suggested, practical channels free of distortion are unavailable at presently required high-data rates.

The receiver terminal, in addition to data sink 47, accordingly comprises orthogonal matrix multiplier 32, principal forward transversal equalizer 33, C coefficient update circuit 34, data decision circuit 45, direct error computer 46 conjugate transversal processor 38, inverse error computer 39, auxiliary transversal processor 37, D coefficient update circuit 36 and delay unit 35.

Forward transversal equalizer 33, together with data decision circuit 45 and error circuit 46, are conventional and implement equation (11) by deriving and updating the C tap-gain coefficients from direct error signal $e_k$. Forward transversal equalizer 33 includes a symmetrical TDL with a center reference tap and N leading and lagging taps for a total of (2N+1) taps. The C coefficients are stored and updated in update circuit 34 as shown. The remainder of the receiver terminal implements equations (12) and (16) through (20).

Auxiliary transversal processor 37 is structurally identical to forward transversal equalizer 33 and includes a TDL with (2N+1) taps. Processor 37 differs from equalizer 33, however, in being governed by a different D tap-gain coefficent array derived from and updated by inverse error signal $e_k'$. Processor 37 operates on the incoming signal samples $x_k$ delayed by N symbol intervals T in delay unit 35 to assure alignment in time with the summation output $y_k$ of forward equalizer 33.

Inverse error $e_k'$ is computed in computer 39 from the difference between the summation output $z_k$ from processor 37 and the output $y_k'$ of conjugate transversal processor 38. Processor 38 is a TDL with (2N+1) taps whose inputs are data decision $\hat{a}_k$ from the output of data decision circuit 45 over lead 40 and whose tap-gain coefficients are the same C coefficients as those employed in forward equalizer 33, but reversed in time sequence as required by equation (18). The C coefficients are transferred to processor 38 from C coefficient update circuit 34 over leads 42. No correlations are required in processor 38, which makes a linear summation $y_k'$ of each of the products of the C coefficients-in inverse order-and detected data symbols $\hat{a}_k$. The difference $(z_k - y_k')$ taken in inverse error computer 39 forms inverse error $e_k'$, from which the D coefficients are formed.

The D coefficients are stored in D coefficient update circuit 36 and are transferred over leads 43 to orthogonal matrix multiplier 32. Orthogonal multiplier 32 can advantageously include a further TDL and summation circuit of the same type employed in forward equalizer 33. Orthogonal matrix mulitplier 32 premultiplies the received data sequence $x_k$ by the array of D coefficients and sums the resulting products to form an orthogonalized sequence orthogonalized $x_k'$ for updating the C tap-gain coefficients in accordance with equation (12). The orthogonalized signal sample sequence $x_k'$ is transferred to C coefficient update circuit over lead 48.

The improved adaptive equalizer of this invention implements an adaptive self-orthogonalizing equalization algorithm to impart more rapid convergence properties than heretofore attainable with minimal complexity.

While this invention has been disclosed by way of a specific illustrative embodiment, it is to be understood that its principles are susceptible of a wide range of modification within the scope of the following claims.

What is claimed is:

1. In combination with a first forward transversal equalizer for a synchronous digital data receiver including a data detector from which a first tap-gain adjustment error signal is derived and a first set of variable tap-gain coefficient values are stored for such forward equalizer,
   a conjugate transversal structure responsive to said first set of tap-gain coefficient values applied in inverse time order for operating an output data from said data detector,
   a second forward transversal equalizer structure responsive to a second set of tap-gain coefficient values for operating on received digital data delayed by half the length of said first equalizer,
   means responsive to a second tap-gain adjustment error signal derived from the difference between the respective outputs of said conjugate structure and said second forward equalizer structure for supplying said second set of tap-gain coefficient values to said second forward transversal equalizer structure, and
   means further responsive to said second set of tap-gain coefficient values for orthogonalizing sequences of received signals for updating said first set of variable tap-gain coefficient values.

2. The combination set forth in claim 1 in which each of said first and second forward transversal equalizer structures, said conjugate transversal structure and said orthogonalizing means comprises tapped delay lines with identical numbers of taps, adjustable tap-gain multipliers at each tap, and a summation circuit for the products of tap signals and respective first and second sets of tap-gain coefficient values.

3. In combination in a synchronous digital data receiver having a data detector and a data sink,
   a first forward transversal equalizer responsive to a first error signal derived from the difference between the input and output of said data detector for applying a first set of coefficient values to a sequence of received signal samples,
   a conjugate transversal structure responsive to said first set of coefficient values applied thereto in time-reversed order for operating on the output of said data detector,
   a second forward transversal equalizer responsive to a second set of coefficient values for operating on a sequence of received signal samples delayed by the half-length of said first transversal equalizer,
   means for deriving a second error signal from the difference between the outputs of said conjugate transversal structure and said second transversal equalizer for application to said second transversal equalizer,
   means also responsive to said second set of coefficient values for orthogonalizing sequences of received signal samples, and
   means responsive to orthogonalized sequences of received signal samples from said orthogonalizing means for rapidly updating said first set of tap-gain coefficient values.

4. In a receiver for amplitude-modulated digital data signals, an equalizer having fast convergence properties comprising
   a first plurally tapped transversal equalizer structure accepting equally spaced samples of received data signals,
   first coefficient storage and updating means for a first array of tap-gain coefficient values for controlling the gains of data-signal samples at each of the taps on said first transversal equalizer structure,
   data decision means responsive to the output of said first equalizer structure for producing recovered data signals,
   first error-computer means responsive to the difference between the input and the output of said data decision means for generating a first error signal for application to said first coefficient storage and updating means,
   a second plurally tapped transversal structure accepting equally spaced samples of recovered data signals from said data decision means,
   means for applying said first sequence of coefficient values to said second transversal structure in time-reversed order relative to the sequence of signal sample incident thereon, a third plurally tapped transversal structure accepting equally spaced samples of received data signals from said receiver, second coefficient storage and updating means for a second array of tap-gain coefficient values for controlling said third transversal structure, second error-computing means responsive to the difference between the outputs of said second and third transversal structures for generating a second error signal for application to said second coefficient storage and updating means, and matrix multiplying means for orthogonalizing sequences of received data signal samples for application to said first coefficient storage and updating means such that said first array of tap-gain coefficient values are updated under the joint control of said first error signal and the orthogonalized sequence of received data signals resulting from matrix multiplication.

5. The receiver defined in claim 4 in which each of said first, second and third transversal structures and said matrix multiplying means has the same number of taps.

6. The receiver defined in claim 4 in further combination with delay means for received data signals applied to said third transversal structure having half the delay amount of said first transversal structure.

* * * * *